US012653320B2

(12) United States Patent
Liu et al.

(10) Patent No.: US 12,653,320 B2
(45) Date of Patent: Jun. 16, 2026

(54) MOUNTING ASSEMBLY FOR MOUNTING A TV ONTO A BED FRAME

(71) Applicant: MOTOMOTION CHINA CORPORATION, Changzhou (CN)

(72) Inventors: Chih Hsiung Liu, Benoni (ZA); Hai Guo Jiang, Changzhou (CN)

(73) Assignee: MOTOMOTION CHINA CORPORATION, Changzhou (CN)

( * ) Notice: Subject to any disclaimer, the term of this patent is extended or adjusted under 35 U.S.C. 154(b) by 0 days.

(21) Appl. No.: 18/228,942

(22) Filed: Aug. 1, 2023

(65) Prior Publication Data

US 2025/0043907 A1    Feb. 6, 2025

(51) Int. Cl.
*A47C 21/00* (2006.01)
*F16M 13/02* (2006.01)
*A47C 19/22* (2006.01)

(52) U.S. Cl.
CPC ......... *A47C 21/003* (2013.01); *F16M 13/022* (2013.01); *A47C 19/22* (2013.01); *F16M 2200/08* (2013.01)

(58) Field of Classification Search
CPC .... F16M 11/28; F16M 11/00; F16M 2200/08; F16M 13/022; F16M 2200/027; F16M 11/08; F16M 13/02; F16B 7/1472; F16B 2/065; A47C 19/22; A47C 21/003; A61G 7/0503; A61G 7/0501; A61G 7/05; A47B 23/025; A47B 2220/0094; A47B 2200/05
USPC .............................. 248/534, 538, 539, 176.1
See application file for complete search history.

(56) References Cited

U.S. PATENT DOCUMENTS

| | | | | |
|---|---|---|---|---|
| 772,564 A | * | 10/1904 | Gallagher ............ | A61G 7/0503 5/503.1 |
| 1,797,847 A | * | 3/1931 | Vandagriff ............. | A47B 23/02 108/5 |
| 2,647,516 A | * | 8/1953 | Whitaker ............... | A47B 23/02 5/658 |
| 2,910,315 A | * | 10/1959 | Stevens ................. | F16B 35/005 403/367 |
| 3,042,937 A | * | 7/1962 | Young .................... | A47C 19/22 108/137 |
| 3,232,249 A | * | 2/1966 | Perez ..................... | A47B 21/03 108/42 |
| 3,514,794 A | * | 6/1970 | Pofferi ................. | A61G 7/0503 5/2.1 |
| 3,875,356 A | * | 4/1975 | Heim ....................... | H01H 3/14 200/61.7 |

(Continued)

FOREIGN PATENT DOCUMENTS

| | | | | |
|---|---|---|---|---|
| CN | 113108193 A | * | 7/2021 | .......... F16M 11/046 |
| CN | 220966910 U | * | 5/2024 | |

(Continued)

*Primary Examiner* — Taylor Morris
(74) *Attorney, Agent, or Firm* — Law Offices of Steven W. Weinrieb

(57) ABSTRACT

An assembly for mounting a TV onto a bed frame comprises a base, a vertically oriented standard mounted within the base, a TV mounted thereon, and a vertically adjustable assembly slidably mounted upon the standard so as to be vertically adjustable along the vertical height of the standard so as to permit the vertically adjustable assembly to be fixedly connected to various different bed frames which may have various different height dimensions relative to or above the floor or other support platform.

6 Claims, 8 Drawing Sheets

(56)  References Cited

U.S. PATENT DOCUMENTS

| | | | | |
|---|---|---|---|---|
| 3,889,910 A * | 6/1975 | Walters | A61G 7/0533 | |
| | | | 248/921 | |
| 3,990,671 A * | 11/1976 | Seyler | F16B 21/10 | |
| | | | 248/188.7 | |
| 4,020,510 A * | 5/1977 | Fabian | A47B 23/007 | |
| | | | 5/507.1 | |
| 4,642,824 A * | 2/1987 | Hodges | A61G 7/0533 | |
| | | | 5/81.1 R | |
| 4,655,632 A * | 4/1987 | Smith | F16B 9/058 | |
| | | | 297/344.22 | |
| 4,842,231 A * | 6/1989 | Warshawsky | F16M 13/02 | |
| | | | 248/295.11 | |
| 5,009,379 A * | 4/1991 | Sadler | A47B 23/02 | |
| | | | 248/174 | |
| 5,072,910 A * | 12/1991 | May | F16M 11/42 | |
| | | | 248/412 | |
| 5,207,405 A * | 5/1993 | Cobb | F16M 11/10 | |
| | | | 5/507.1 | |
| 5,374,074 A * | 12/1994 | Smith | A61G 5/10 | |
| | | | D12/131 | |
| 5,421,548 A * | 6/1995 | Bennett | A61G 12/008 | |
| | | | 5/503.1 | |
| 5,918,841 A * | 7/1999 | Sweere | A47B 21/0314 | |
| | | | 248/281.11 | |
| 5,931,315 A * | 8/1999 | Lorentz | G11B 33/0483 | |
| | | | 211/205 | |
| 6,023,800 A * | 2/2000 | Stickley | A61G 7/0507 | |
| | | | 5/503.1 | |
| 6,079,678 A * | 6/2000 | Schott | A61G 7/05 | |
| | | | 5/503.1 | |
| 6,213,435 B1 * | 4/2001 | Minet | A61G 7/053 | |
| | | | 5/81.1 R | |
| 6,334,594 B1 * | 1/2002 | Bailey | F16M 11/2014 | |
| | | | 248/219.4 | |
| 6,345,794 B1 * | 2/2002 | Varner | A47F 8/00 | |
| | | | 248/230.1 | |
| 6,419,511 B2 * | 7/2002 | Lizell | A47B 21/06 | |
| | | | 439/210 | |
| 6,715,722 B2 * | 4/2004 | Roberts | B60R 11/0229 | |
| | | | 248/129 | |
| 7,118,080 B2 * | 10/2006 | Chan | F16M 11/105 | |
| | | | 248/161 | |
| 7,182,301 B1 * | 2/2007 | Oddsen, Jr. | F16M 11/24 | |
| | | | 248/74.5 | |

| | | | | |
|---|---|---|---|---|
| 7,770,848 B2 * | 8/2010 | Johnson | F16L 3/1207 | |
| | | | 248/65 | |
| 7,900,566 B1 * | 3/2011 | Bunker | A47C 7/68 | |
| | | | 108/42 | |
| 8,054,388 B2 * | 11/2011 | Hurd | F16M 11/28 | |
| | | | 248/205.5 | |
| 8,459,602 B2 * | 6/2013 | Herskovic | F16M 11/2035 | |
| | | | 248/229.15 | |
| 8,662,461 B2 * | 3/2014 | Mori | F16B 2/10 | |
| | | | 248/230.4 | |
| 9,089,461 B1 * | 7/2015 | Vosters | A61G 7/0536 | |
| 9,386,860 B2 * | 7/2016 | Brannan | A47B 21/0073 | |
| 9,631,769 B2 * | 4/2017 | McGowan | H02G 3/0418 | |
| 9,663,179 B2 * | 5/2017 | Wagner | B62K 21/12 | |
| 9,955,106 B1 * | 4/2018 | Veikos | H04N 5/655 | |
| 10,591,006 B2 * | 3/2020 | Puterbaugh | F16D 65/12 | |
| 10,690,282 B1 * | 6/2020 | Sierra Murillo | F16M 13/022 | |
| 10,786,407 B2 * | 9/2020 | Ellis | B60D 1/52 | |
| 11,406,182 B1 * | 8/2022 | Stoddard | A47B 23/04 | |
| 2003/0042373 A1 * | 3/2003 | MacLeod | F16M 11/24 | |
| | | | 248/125.1 | |
| 2007/0132203 A1 * | 6/2007 | Yamakoshi | B62K 19/36 | |
| | | | 280/288.4 | |
| 2008/0308687 A1 * | 12/2008 | Terry | F16B 12/40 | |
| | | | 248/122.1 | |
| 2010/0107932 A1 * | 5/2010 | O'Neill | A47B 23/046 | |
| | | | 108/92 | |
| 2011/0101179 A1 * | 5/2011 | Fritch | F16M 13/02 | |
| | | | 248/125.7 | |
| 2012/0001416 A1 * | 1/2012 | Peng | F16B 7/1472 | |
| | | | 285/145.1 | |
| 2015/0034780 A1 * | 2/2015 | Petry | F16M 11/2014 | |
| | | | 29/525.01 | |
| 2016/0073778 A1 * | 3/2016 | Deroy Vanzuydewyn | | |
| | | | F16M 13/022 | |
| | | | 248/512 | |
| 2020/0336581 A1 * | 10/2020 | Allen | F16M 11/16 | |
| 2021/0301975 A1 * | 9/2021 | Klegin | F16M 13/022 | |

FOREIGN PATENT DOCUMENTS

| | | | | | |
|---|---|---|---|---|---|
| FI | 125979 B | * | 5/2016 | | A61G 7/05 |
| GB | 158057 A | * | 1/1921 | | A47B 23/02 |
| KR | 20100001723 U | * | 2/2010 | | A47B 23/02 |
| KR | 20100038944 A | * | 4/2010 | | F16B 7/10 |
| KR | 20120065987 A | * | 6/2012 | | A47B 23/06 |
| KR | 20220064261 A | * | 5/2022 | | F16M 11/2092 |
| WO | WO-2018064549 A1 | * | 4/2018 | | F16M 11/045 |

* cited by examiner

200

202

206

204

204

MOUNTING ASSEMBLY FOR MOUNTING A TV ONTO A BED FRAME

FIELD OF THE INVENTION

The present invention relates to mounting assemblies for mounting a first structure onto a second structure, and more particularly to a mounting assembly for mounting a TV onto a bed frame.

BACKGROUND OF THE INVENTION

A TV, operatively connected or associated with, or attached to a bed, is sometimes needed or desired within bedroom exhibition halls or sales establishments so as to display the important features of a particular bed to prospective buyers, or to simulate an environment within which the prospective buyers can watch TV from the comfort of their bed. With the advent of large-screen TVs, many consumers of course have their TVs mounted upon a wall facing their bed, however, sometimes, for example, when watching a movie or a sporting event, it is desired to have the TV positioned closer to the bed and to the occupants lying comfortably within the bed, than when the TV is mounted upon the wall facing the bed. In a similar manner, some gamers, that is, people who enjoy playing video games, also prefer to have their TV screens positioned close to them while sitting or lying in bed so as to enhance their gaming experiences. In furtherance of these objectives, FIG. 1 discloses a first known PRIOR ART structural assembly for mounting a TV upon a framework which is operatively connected to the bed framework. More particularly, it is seen that the structural assembly, generally indicated by the reference character 100, comprises a transversely extending foot board 102 to which a pair of vertically extending, laterally spaced, front frame members 104, 104 are fixedly attached. In a similar manner, a transversely extending head board 106 has a pair of vertically extending, laterally spaced, rear frame members 108, 108 fixedly attached thereto, the front frame members 104, 104 and the rear frame members 108, 108 effectively defining a four-corner upstanding framework. A first lower pair of oppositely disposed, longitudinally extending frame members 110,110, only one of which is visible in FIG. 1, serve to connect each pair of front and rear frame members 104, 108 together, while a second upper pair of oppositely disposed, longitudinally extending frame members 112, 112 likewise serve to connect each pair of front and rear frame members 104, 108 together.

In addition, a forward, cross-member 114 serves to fixedly connect the upper ends of the two front frame members 104, 104 together, while a rearward, cross-member 116 serves to fixedly connect the upper ends of the two rear frame members 108, 108 together. In this manner, it can readily be appreciated that the structural assembly 100 defines a very stable framework upon which a TV can be mounted, especially a relatively heavy TV, wherein a TV 118 is in fact disclosed as being mounted upon a transversely extending cross-member 120 which has its opposite ends fixedly mounted upon or connected to mid-portions of the second upper pair of oppositely disposed, longitudinally extending frame members 112, 112, the TV 118 effectively being mounted above the bed 122 which is supported upon a bed framework. This TV mounting system or assembly obviously satisfies the aforenoted objectives of mounting a TV at a position which is closer to the bed and its occupants, as opposed to when the TV is mounted upon a wall facing the bed, however, this system or assembly does present some drawbacks which may not be acceptable to some people. For example, some people may not feel comfortable lying upon a bed which is disposed within a surrounding four-corner framework. In addition, some people may not like the fact that their bed is disposed within a large surrounding framework which occupies a large amount of volumetric space, thereby distracting from the aesthetic or intimate environment of a bedroom. Still further, some people may not feel comfortable lying beneath an overhanging TV, particularly if the TV is a relatively heavy TV, for fear that the TV may accidentally fall while the occupants are lying in the bed.

With reference being made to FIG. 2, a second known PRIOR ART structural assembly for mounting a TV upon a framework which is operatively connected to, or associated with, a bed framework is disclosed and is generally indicated by the reference character 200. More particularly, it is seen that the structural assembly 200 comprises an arcuately-shaped post or standard 202 which is fixedly attached to, for example, a headboard or similar frame member of the bed framework supporting one or more bed mattresses 204, wherein the arcuately-shaped post or standard 202 extends over and above the bed mattresses 204 such that a free or cantilevered end portion of the post or standard 202 is disposed over and above foot end sections of the bed mattresses 204, and upon which a TV 206 may be mounted. As was the case, however, with the first TV mounting system or assembly 100, this second TV mounting system or assembly also satisfies the aforenoted objectives of mounting a TV at a position which is closer to the bed and its occupants, as opposed to when the TV is mounted upon a wall facing the bed, this system or assembly likewise presents some drawbacks which may not be acceptable to some people. For example, some people may not feel comfortable lying beneath an overhanging TV, particularly if the TV is a relatively heavy TV, for fear that the TV may accidentally fall while the occupants are lying in the bed.

A need therefore exists in the art for a new and improved mounting assembly. Another need exists in the art for a new and improved mounting assembly for use in connection with a bed. Still another need exists in the art for a new and improved mounting assembly for use in connection with a bed and for attachment to a bed frame. Yet another need exists in the art for a new and improved mounting assembly for use in connection with a bed and for attachment to a bed frame such that the mounting assembly is stably supported. Still yet another need exists in the art for a new and improved mounting assembly for use in connection with a bed, for attachment to a bed frame such that the mounting assembly is stably supported, and wherein the mounting assembly is capable of mounting a TV thereon. Yet still another need exists in the art for a new and improved mounting assembly for use in connection with a bed, for attachment to a bed frame such that the mounting assembly is stably supported, and wherein the mounting assembly is capable of mounting a TV thereon in such a manner that the TV is not disposed over and above the bed and the occupants lying therein. A further need exists in the art for a new and improved mounting assembly for use in connection with a bed, for attachment to a bed frame such that the mounting assembly is stably supported, wherein the mounting assembly is capable of mounting a TV thereon in such a manner that the TV is not disposed over and above the bed and the occupants lying therein, and wherein the mounting assembly is height-adjustable so as to be capable of being used with various different beds having various different heights.

OVERALL OBJECTIVES OF THE INVENTION

An overall objective of the present invention is to provide a new and improved mounting assembly. Another overall objective of the present invention is to provide a new and improved mounting assembly for use in connection with a bed. Still another overall objective of the present invention is to provide a new and improved mounting assembly for use in connection with a bed and for attachment to a bed frame. Yet another overall objective of the present invention is to provide a new and improved mounting assembly for use in connection with a bed and for attachment to a bed frame such that the mounting assembly is stably supported. Still yet another overall objective of the present invention is to provide a new and improved mounting assembly for use in connection with a bed, for attachment to a bed frame such that the mounting assembly is stably supported, and wherein the mounting assembly is capable of mounting a TV thereon. Yet still another overall objective of the present invention is to provide a new and improved mounting assembly for use in connection with a bed, for attachment to a bed frame such that the mounting assembly is stably supported, and wherein the mounting assembly is capable of mounting a TV thereon in such a manner that the TV is not disposed over and above the bed and the occupants lying therein. A further overall objective of the present invention is to provide a new and improved mounting assembly for use in connection with a bed, for attachment to a bed frame such that the mounting assembly is stably supported, wherein the mounting assembly is capable of mounting a TV thereon in such a manner that the TV is not disposed over and above the bed and the occupants lying therein, and wherein the mounting assembly is height-adjustable so as to be capable of being used with various different beds having various different heights.

SUMMARY OF THE INVENTION

A mounting assembly for mounting a TV onto a bed frame comprises a base or foundation which is adapted to be disposed upon a floor or other support platform; a vertically oriented standard, pole, or rod having a first lower end portion thereof fixedly mounted within the base or foundation, while a second, oppositely disposed upper end portion thereof is adapted to have a TV mounted and supported thereon; and a vertically adjustable assembly slidably mounted upon the vertically oriented standard, pole, or rod so as to be vertically adjustable along the vertically height or extent of the vertically oriented standard, pole, or rod so as to permit the vertically adjustable assembly to be fixedly connected to various different bed frames which may have various different height dimensions relative to or above the floor or other support platform. More particularly, the vertically adjustable assembly comprises an adjustment plate integrally connected to or formed with an adjustment block which is mounted upon the vertically oriented standard, pole, or rod so as to annularly surround the same. A guide sleeve, fabricated from a suitable material, such as, for example, polytetrafluoroethylene or TEFLON®, nylon, or ABS (acrylonitrile butadiene styrene) is interposed between the adjustment block and the vertically oriented standard, pole, or rod so as to permit the adjustment block to be easily and smoothly moved along the vertical length of the vertically oriented standard, pole, or rod in order to easily achieve the vertical positional adjustments of the adjustment block. A pair of support plates are fixedly connected to opposite sides of the adjustment plate and are adapted to be fixedly connected to oppositely disposed longitudinally extending frame members of the bed frame. Lastly, a compression block, which may also be fabricated from a suitable material, such as, for example, polytetrafluoroethylene or TEFLON®, nylon, or ABS (acrylonitrile butadiene styrene)

is interposed between the adjustment block and the vertically oriented standard, pole, or rod, and a plurality of wing bolts are mounted upon and extend through the adjustment block so as to engage the compression block. When the wing bolts are tightened so as to threadedly advance within the adjustment block, the wing bolts will engage the compression block so as to forcibly compress the same into frictional engagement with an outer peripheral portion of the vertically oriented standard, pole, or rod such that the adjustment block will effectively be fixed at a particular height location upon the vertically oriented standard, pole, or rod. Conversely, when the wing bolts are loosened so as to threadedly retract the wing bolts out from the adjustment block, the wing bolts will effectively be disengaged from the compression block, to a predetermined degree, so as to effectively reduce the frictional engagement of the compression block with respect to or upon the outer peripheral portion of the vertically oriented standard, pole, or rod such that the adjustment block can now be freely moved upwardly and downwardly along the vertical extent of the vertically oriented standard, pole, or rod whereby the adjustment assembly can be moved to a different height position along or relative to the vertically oriented standard, pole, or rod. In this manner, the adjustment assembly can be moved to predetermined height positions so as to selectively correspond to various different height dimensions of various different bed frames to which the mounting assembly is to be attached.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
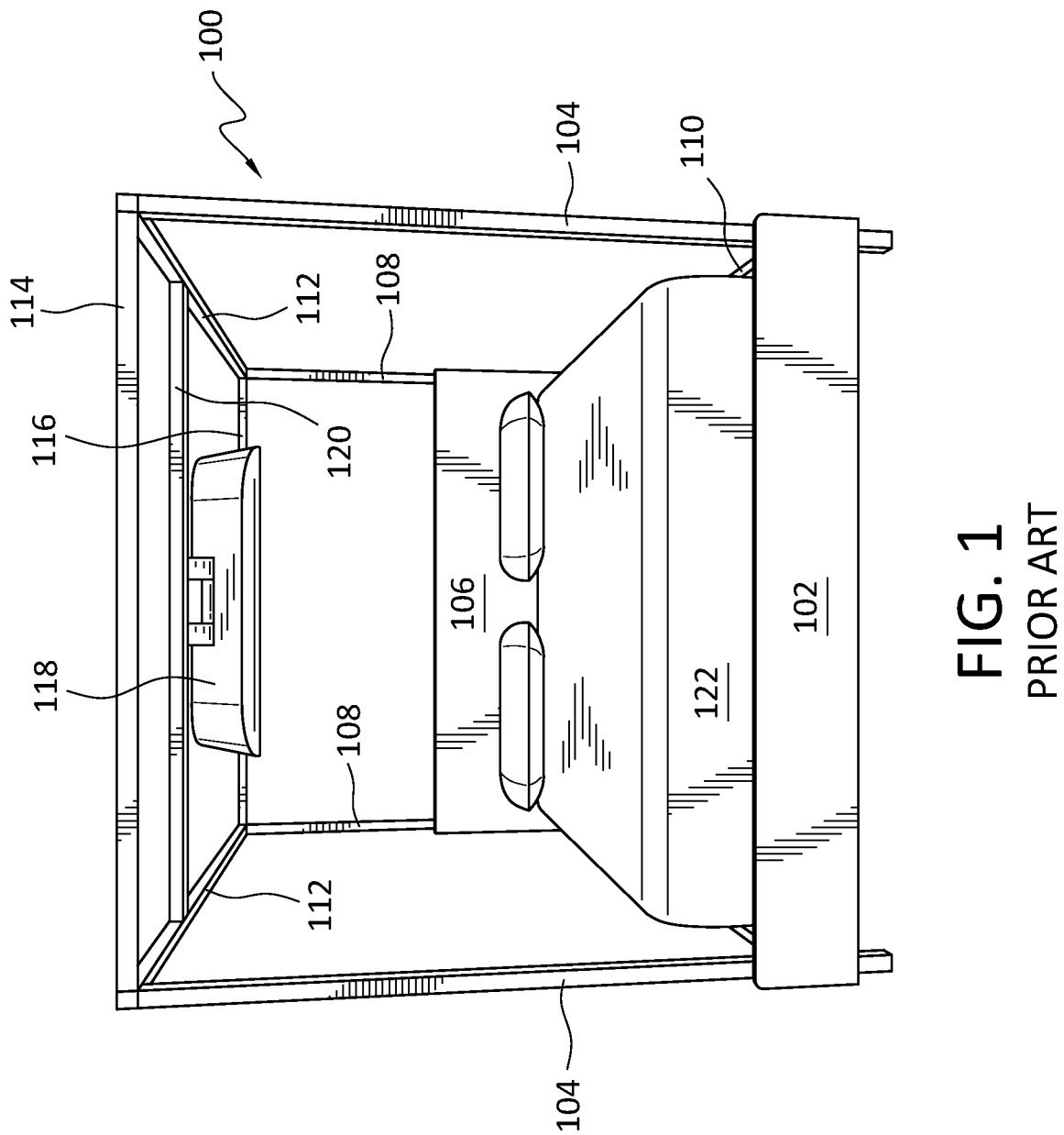
FIG. 1 is a front elevational/perspective view of a first PRIOR ART mounting assembly for mounting a TV upon a bed frame.
Figure 2:
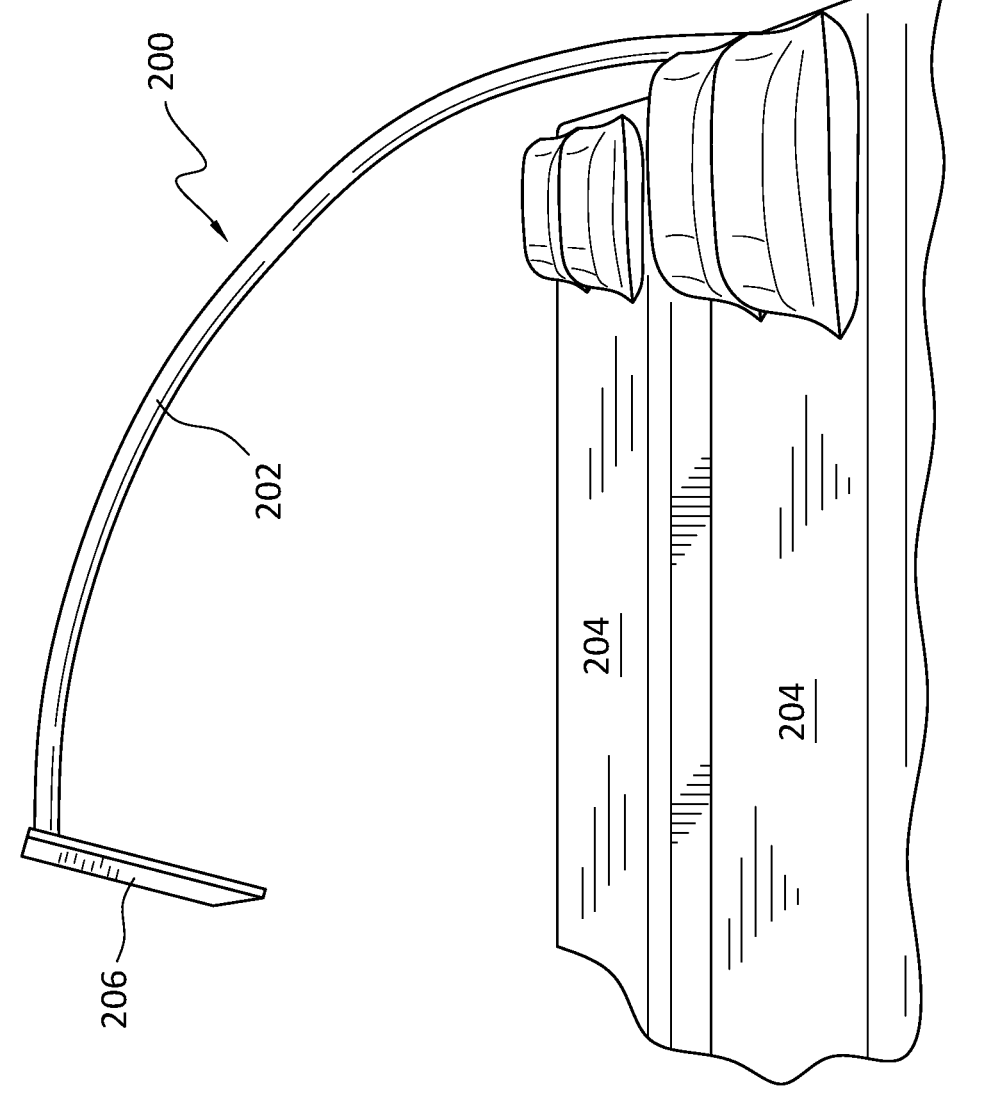
FIG. 2 is a side elevational/perspective view of a second PRIOR ART mounting assembly for mounting a TV upon a bed frame.
Figure 3:
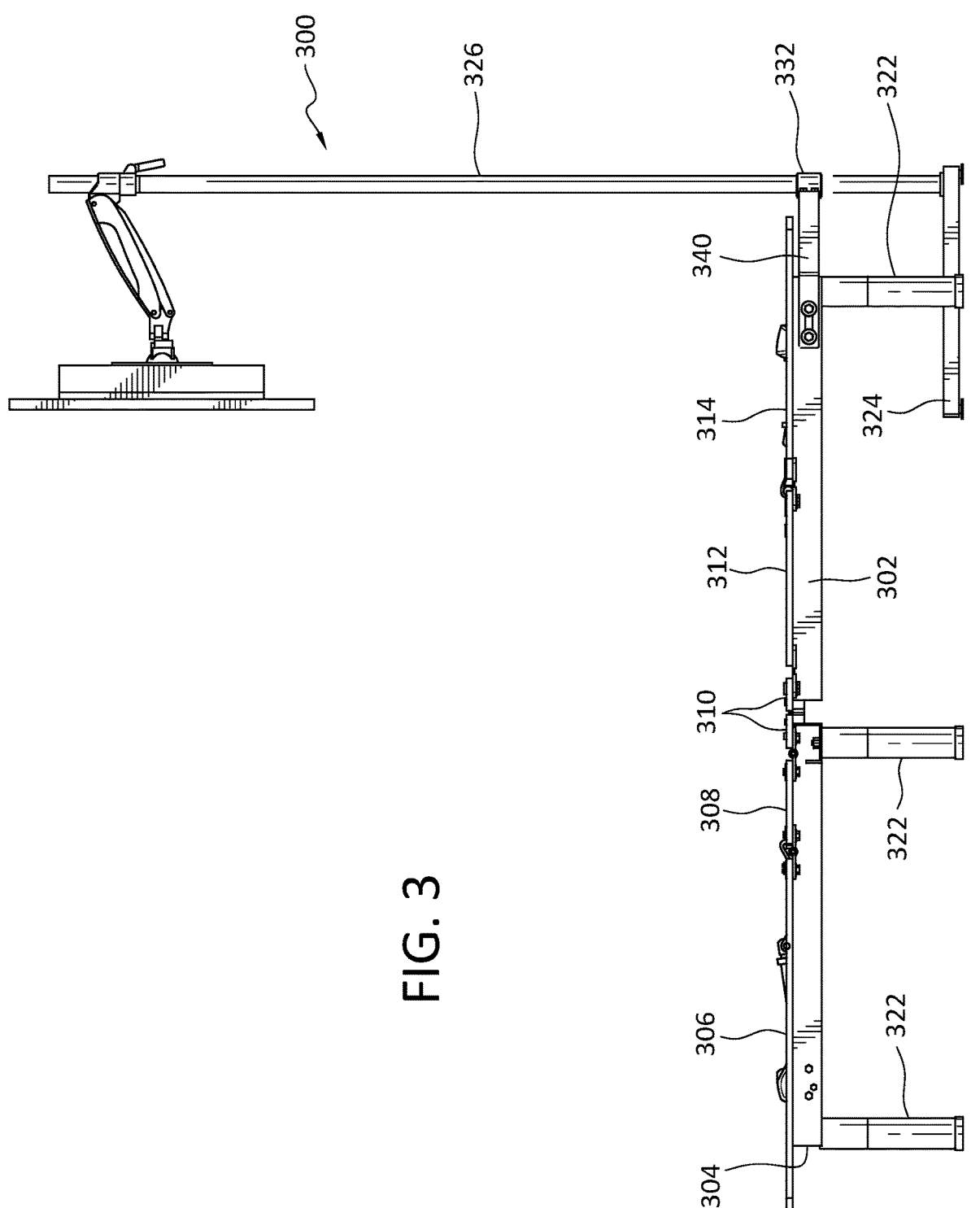
FIG. 3 is a side elevational view of a new and improved mounting assembly for mounting a TV upon a bed frame as constructed in accordance with the teachings and principles of the present invention, and wherein the various deck components of the bed are disposed at their retracted positions.
Figure 4:
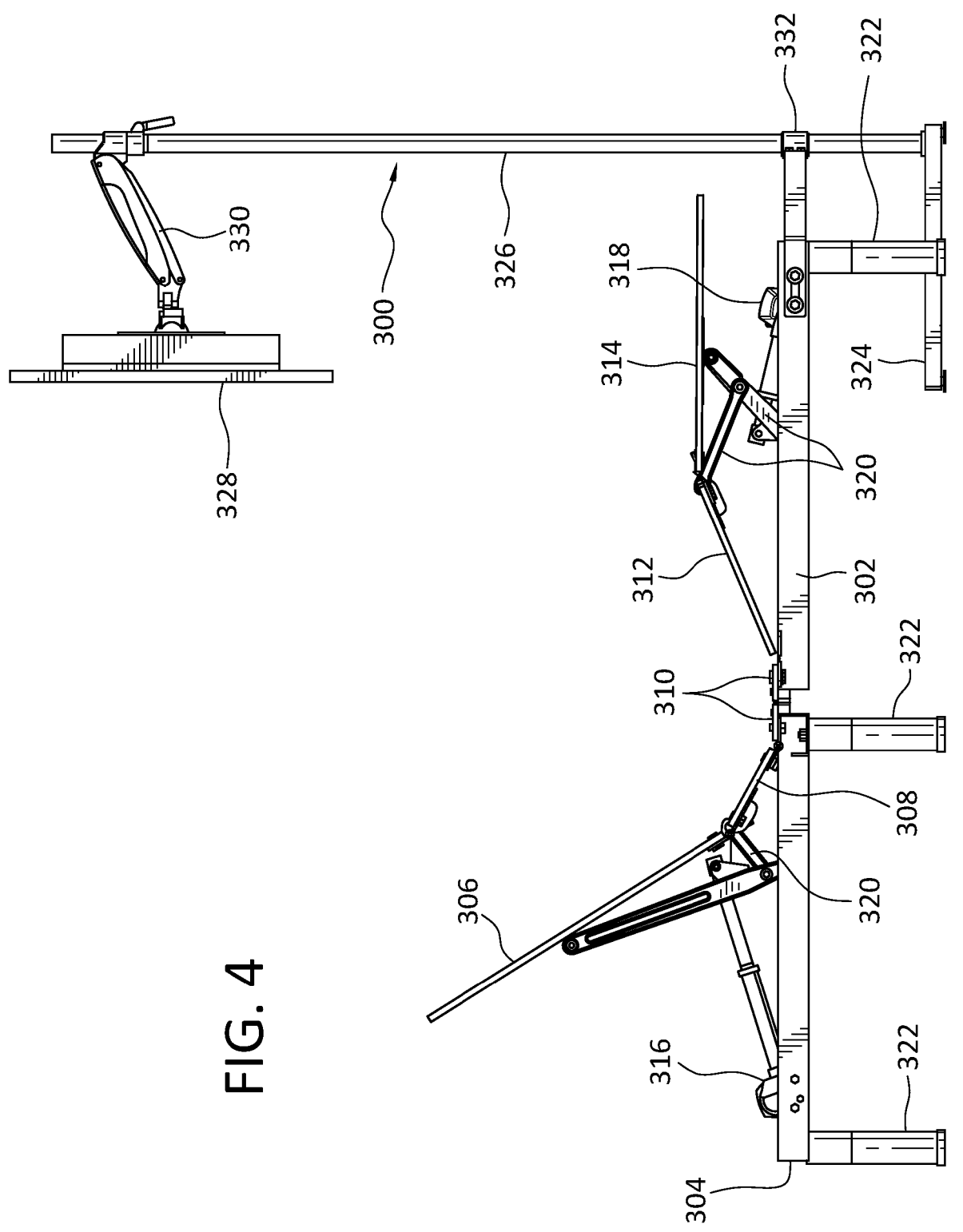
FIG. 4 is a side elevational view of the new and improved mounting assembly for mounting a TV upon a bed frame, as constructed in accordance with the teachings and principles of the present invention and as illustrated within FIG. 3, wherein, however, the various deck components of the bed are disposed at deployed positions.
Figure 5:
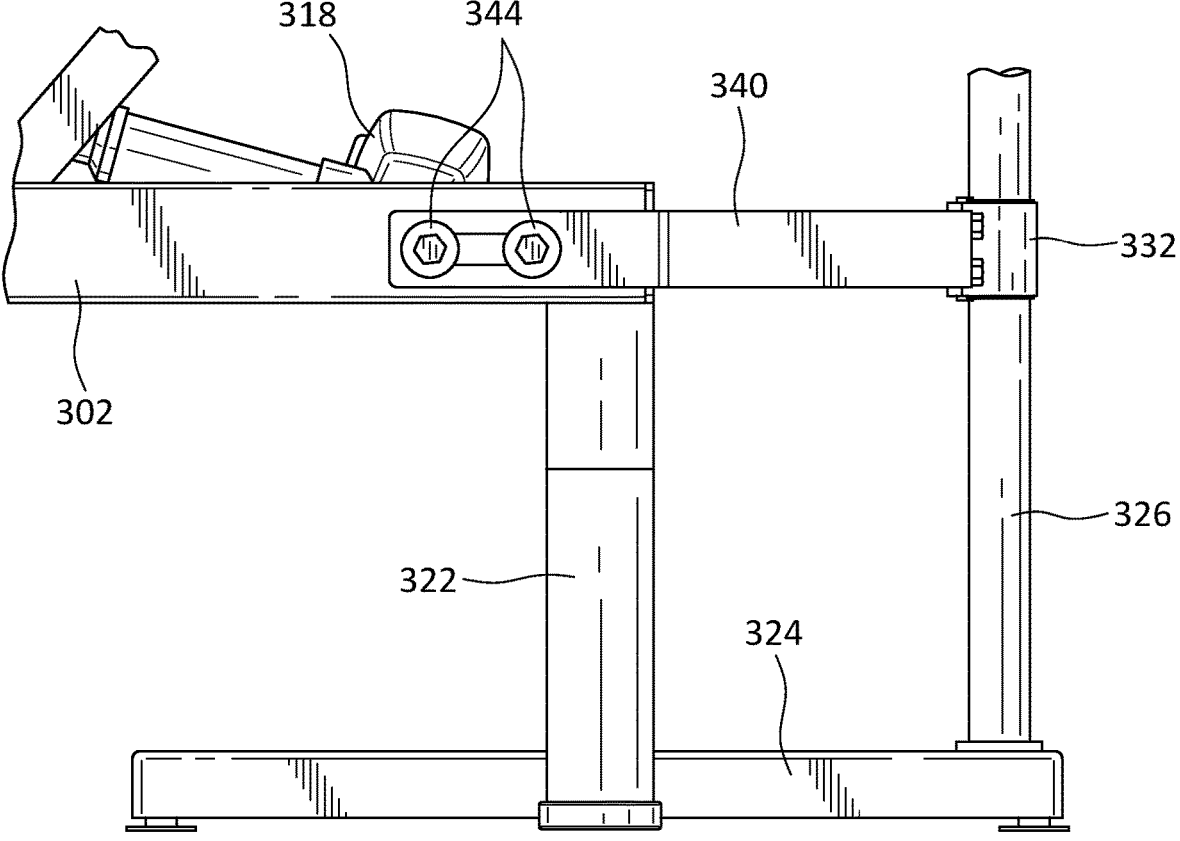
FIG. 5 is a partial, enlarged side elevational view of the new and improved mounting assembly for mounting a TV upon a bed frame, as constructed in accordance with the teachings and principles of the present invention and as illustrated within FIGS. 2 and 3, wherein some of the details as to how the support plates, fixedly connected at first ends thereof to the adjustment block, are fixedly connected at second ends thereof to oppositely disposed longitudinally extending frame members of the bed frame.
Figure 6:
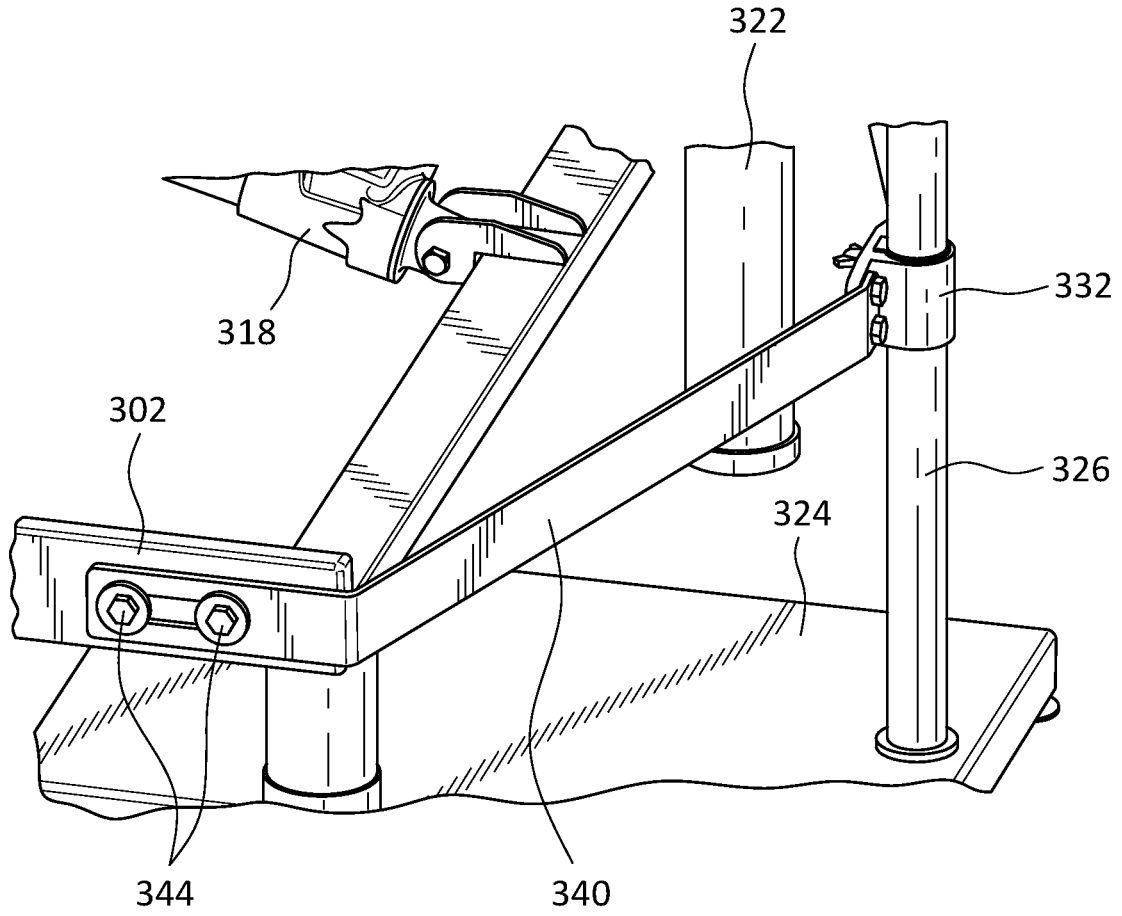
FIG. 6 is a partial, enlarged side perspective view of the new and improved mounting assembly for mounting a TV upon a bed frame, as constructed in accordance with the teachings and principles of the present invention and as illustrated within FIGS. 2,3 and 5, wherein additional details as to how the support plates, fixedly connected at first ends thereof to the adjustment block, are fixedly connected at second ends thereof to oppositely disposed longitudinally extending frame members of the bed frame.
Figure 7:
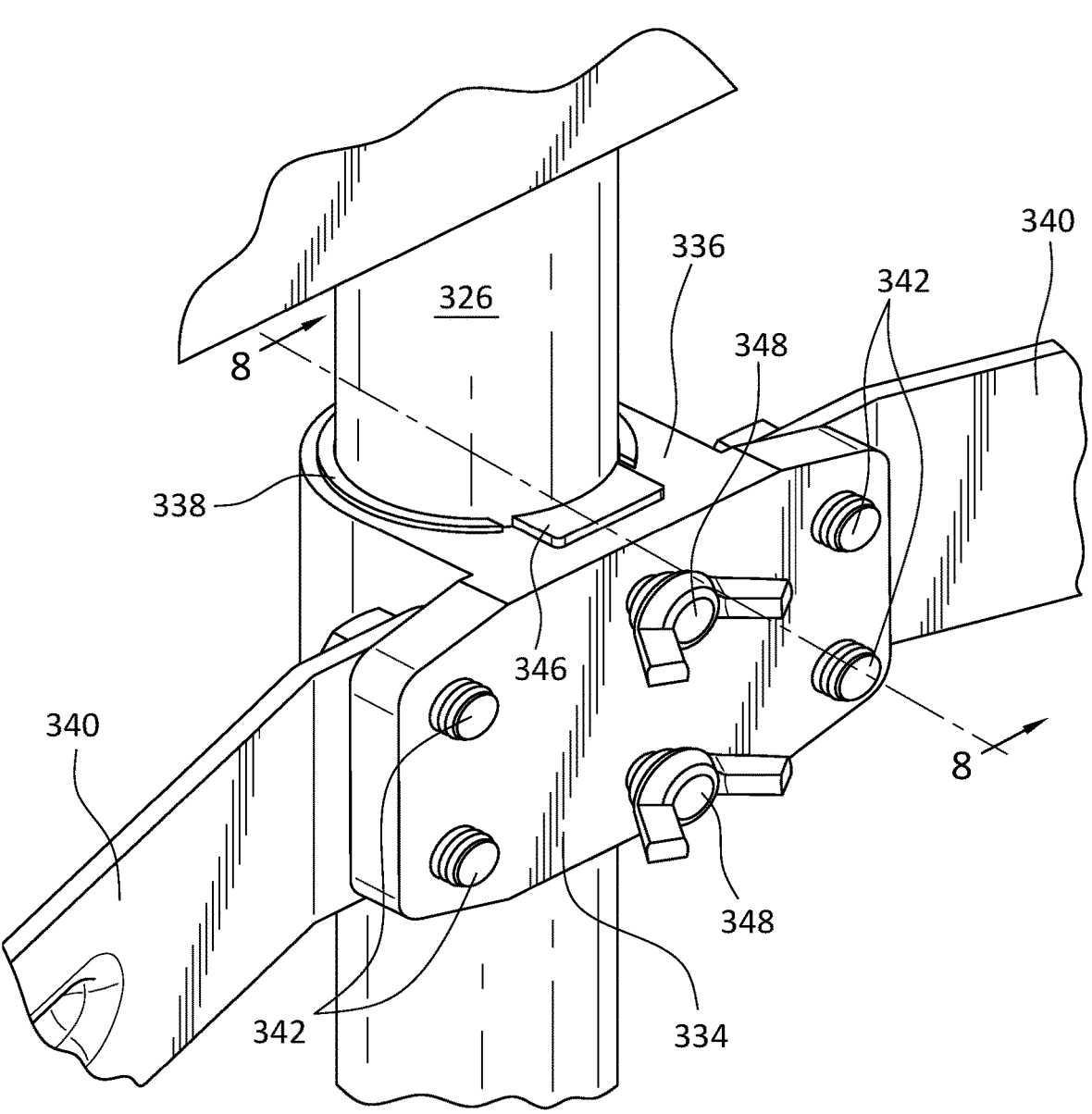
FIG. 7 is a partial, enlarged, detailed perspective view of the new and improved mounting assembly for mounting a TV upon a bed frame, showing how the adjustment block is mounted upon the vertically oriented standard, pole, or rod, how the first ends of the support plates are fixedly connected to oppositely disposed sides of the adjustment block, and how the wing bolts are threadedly engaged within the adjustment block so as to engage or disengage the compression block for, in turn, engaging or disengaging the vertically oriented standard, pole, or rod.

Referring now to the drawings, and more particularly to FIGS. 3 and 4 initially, the new and improved mounting assembly, for mounting a TV onto a bed frame, is disclosed and is generally indicated by the reference character 300. More particularly, the new and improved mounting assembly 300 is adapted or configured to be mounted upon, or connected or affixed to, oppositely disposed longitudinally extending side frame members 302 of a bed frame 304. As is illustrated within FIGS. 3 and 4, the bed frame 304 has a plurality of bed deck members mounted thereon, such as, for example, a back deck 306, a lumbar deck 308, a pair of seat decks 310,310, an upper leg or thigh deck 312, and a lower leg deck 314. As can best be appreciated from FIG. 4, one or more linear actuators 316,318, and a plurality of interconnecting linkage members 320 operatively interconnect the linear actuators 316,318 to the various deck members 306,308,312,314 so as to move the same between retracted positions and extended or deployed positions, it being noted that the pair of seat decks 310,310 are fixed upon the bed frame 304. Lastly, the bed frame 304 is supported by a plurality of leg members 322 which are disposed at the four corners of the bed frame 304 as well as intermediate locations along the longitudinally extending side frame members 302.

Continuing further, it is seen that the new and improved mounting assembly 300 comprises a base or foundation 324 which is adapted to be disposed upon a floor or other support platform, a vertically oriented standard, pole, or rod 326 having a first lower end portion thereof fixedly mounted within the base or foundation 324, while a second, oppositely disposed upper end portion thereof is adapted to have a TV 328 mounted and supported thereon by a suitable mounting bracket assembly 330, and a vertically adjustable assembly 332 which is adapted to be slidably mounted upon the vertically oriented standard, pole, or rod 326 so as to be vertically adjustable along the vertically height or extent of the vertically oriented standard, pole, or rod 326 and thereby permit the vertically adjustable assembly 332 to be fixedly connected to various different bed frames which may have various different height dimensions relative to or above the floor or other support platform, as will become more apparent hereinafter. More particularly, with additional reference being made to FIGS. 5-8, the vertically adjustable assembly 332 is seen to comprise an adjustment plate 334 which is integrally connected to or formed with an adjustment block 336 which is mounted upon the vertically oriented standard, pole, or rod 326 so as to annularly surround the same. A guide sleeve 338, fabricated from a suitable material, such as, for example, polytetrafluoroethylene or TEFLON®, nylon, or ABS (acrylonitrile butadiene styrene) is interposed between the adjustment block 336 and the vertically oriented standard, pole, or rod 326 so as to permit the adjustment block 336 to be easily and smoothly moved along the vertical length of the vertically oriented standard, pole, or rod 326 in order to easily achieve the vertical positional adjustments of the adjustment block 326. A pair of support plates 340 are fixedly connected at first ends thereof to opposite sides of the adjustment plate 334 by means of a plurality of first bolt fasteners 342, and are adapted to be fixedly connected at second opposite ends thereof to the oppositely disposed longitudinally extending frame members 302 of the bed frame 304 by means of a plurality of second bolt fasteners 344. Lastly, a compression block 346 is interposed between the adjustment block 336 and the vertically oriented standard, pole, or rod 326, and a plurality of wing bolts 348 are mounted upon and extend through the adjustment block 336 so as to engage the compression block 346. The compression block 346 may be fabricated from a suitable material, similar to that utilized to form the guide sleeve 338, that is, polytetrafluoroethylene or TEFLON®, nylon, or ABS (acrylonitrile butadiene styrene).

Figure 8:
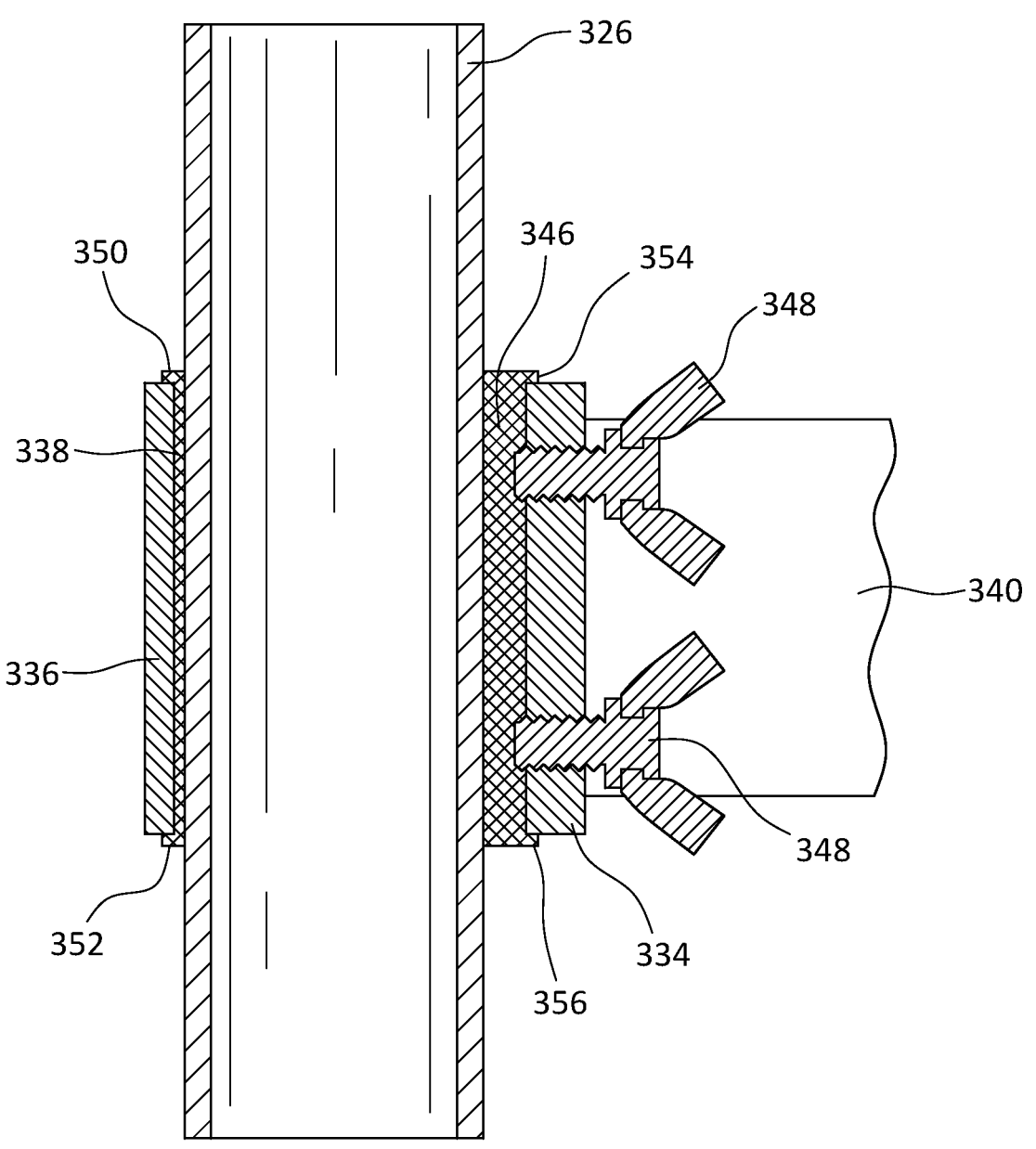
FIG. 8 is a cross-sectional view of the adjustment block and vertically oriented standard, pole, or rod, as taken along the line 8-8 of FIG. 7.

In operation, when the wing bolts 348 are tightened so as to threadedly advance within the adjustment block 336, the wing bolts 348 will engage the compression block 346, as can be readily appreciated from FIG. 8, so as to forcibly compress the compression block 346 into frictional engagement with an outer peripheral portion of the vertically oriented standard, pole, or rod 326 such that the adjustment block 336 will effectively be fixed at a particular height location upon or along the elevational extent of the vertically oriented standard, pole, or rod 326. Conversely, when the wing bolts 348 are loosened so as to threadedly retract the wing bolts 348 out from the adjustment block 336, the wing bolts 348 will effectively be disengaged from the compression block 346, to a predetermined degree, so as to effectively reduce the pressure and frictional engagement of the compression block 346 with respect to or upon the outer peripheral portion of the vertically oriented standard, pole, or rod 326 such that the adjustment block 336 can now be freely moved upwardly and downwardly along the vertical extent of the vertically oriented standard, pole, or rod 326 whereby the adjustment assembly 332 can be moved to a different height position along or relative to the vertically oriented standard, pole, or rod 326. In this manner, the adjustment assembly 332 can be moved to predetermined height positions so as to selectively correspond to various different height dimensions of various different bed frames to which the mounting assembly is to be attached to or upon the oppositely disposed longitudinally extending frame members 302 of the bed frame 304 by means of a plurality of second bolt fasteners 344. As can lastly be appreciated from FIG. 8, the guide sleeve 338 is fixedly mounted within or upon the adjustment block 336 as a result of the guide sleeve 338 being provided with upper and lower annularly extending flanged members 350,352 which engage upper and lower surface portions of the adjustment block 336. In a similar manner, the compression block 346 is fixedly mounted within or upon the adjustment plate 334 as a result of the compression block 346 being provided with upper and lower flanged portions 354,356 which engage upper and lower surface portions of the adjustment plate 334.

Obviously, many variations and modifications of the present invention are possible in light of the above teachings. It is therefore to be understood that within the scope of the appended claims, the present invention may be practiced otherwise than as specifically described herein.

What is claimed is:

1. A connecting assembly for connecting an object to an article of furniture, comprising:

an article of furniture having a pair of oppositely disposed side frame members and an end portion extending transversely between said pair of oppositely disposed side frame members;

an object to be connected to said article of furniture;

a base adapted to be disposed upon a floor or support platform;

a vertically oriented standard fixedly connected at a lower end portion thereof to said base, having said object fixedly connected to an upper end of said vertically oriented standard, and disposed in front of said end portion of said article of furniture extending transversely between said pair of oppositely disposed side frame members;

an adjustable assembly, adjustably mounted upon said vertically oriented standard disposed in front of said end portion of said article of furniture extending transversely between said pair of oppositely disposed side frame members, so as to be capable of being fixed at various elevational positions along said vertically oriented standard; and a pair of supports fixedly connected at first ends thereof to said adjustable assembly, adjustably mounted upon said vertically oriented standard disposed in front of said end portion of said article of furniture extending transversely between said pair of oppositely disposed side frame members, and having second ends thereof extending transversely away from said adjustable assembly in opposite directions so as to be fixedly connected to said pair of oppositely disposed side frame members of said article of furniture wherein a second end of a first one of said pair of supports is connected to a first one of said pair of oppositely disposed side frame members of said article of furniture while a second end of a second one of said pair of supports is connected to a second one of said pair of oppositely disposed side frame members of said article of furniture;

whereby as a result of adjusting the elevational position of said adjustable assembly along said vertically oriented standard, said adjustable assembly will be fixedly connected to said article of furniture which can have any one of a plurality of different height dimensions relative to the floor or support platform.

2. The mounting assembly as set forth in claim 1, wherein:

said object, to be supported by said vertically oriented standard, comprises a TV.

3. The mounting assembly as set forth in claim 1, wherein said adjustable assembly comprises:

an adjustment block mounted upon said vertically oriented standard;

a compression block interposed between said adjustment block and said vertically oriented standard; and a plurality of bolts threadedly mounted within said adjustment block such that when said plurality of bolts are threadedly advanced within said adjustment block, said plurality of bolts will engage and compress said compression block so as to force said compression block into engagement with an external peripheral portion of said vertically oriented standard so as to fix said adjustment block, and said pair of supports fixedly connected thereto, at a predetermined height elevation along said vertically oriented standard.

4. The mounting assembly as set forth in claim 3, further comprising:

a guide sleeve interposed between said adjustment block and said vertically oriented standard so as to facilitate slidable adjustable movement of said adjustment block along said vertically oriented standard.

5. The mounting assembly as set forth in claim 3, wherein:

said compression block is fabricated from a material selected from a group comprising polytetrafluoroethylene (TEFLON®), nylon, and ABS (acrylonitrile butadiene styrene).

6. The mounting assembly as set forth in claim 4, wherein:

said guide sleeve is fabricated from a material selected from a group comprising polytetrafluoroethylene (TEFLON®) nylon, and ABS (acrylonitrile butadiene styrene).

* * * * *